United States Patent
Monde et al.

(10) Patent No.: US 7,437,238 B2
(45) Date of Patent: Oct. 14, 2008

(54) IN-VEHICLE NAVIGATION DEVICE

(75) Inventors: Yasuhiro Monde, Tokyo (JP); Koichi Inoue, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 335 days.

(21) Appl. No.: 10/770,582

(22) Filed: Feb. 4, 2004

(65) Prior Publication Data

US 2004/0172193 A1   Sep. 2, 2004

(30) Foreign Application Priority Data

Feb. 27, 2003   (JP)   ............................. 2003-051316

(51) Int. Cl.
*G01C 21/00* (2006.01)
(52) U.S. Cl. .................. 701/201; 701/206; 701/207; 701/209; 701/211; 701/213; 340/995.1; 340/995.19; 340/995.24; 340/995.27
(58) Field of Classification Search .............. None
See application file for complete search history.

(56) References Cited

U.S. PATENT DOCUMENTS

| | | | |
|---|---|---|---|
| 5,206,811 A * | 4/1993 | Itoh et al. ............... | 701/211 |
| 5,790,973 A * | 8/1998 | Blaker et al. ............. | 455/456.5 |
| 5,911,773 A * | 6/1999 | Mutsuga et al. ............ | 701/200 |
| 6,038,508 A * | 3/2000 | Maekawa et al. ........... | 701/207 |
| 6,282,493 B1 | 8/2001 | Kitagawa et al. | |
| 6,356,839 B1 | 3/2002 | Monde et al. | |
| 6,434,482 B1 * | 8/2002 | Oshida et al. ............... | 701/209 |
| 6,487,497 B2 * | 11/2002 | Khavakh et al. ........... | 701/209 |
| 6,542,814 B2 * | 4/2003 | Polidi et al. ................. | 701/208 |
| 6,668,227 B2 * | 12/2003 | Hamada et al. ............. | 701/208 |
| 2002/0049533 A1 | 4/2002 | Kusano et al. | |

FOREIGN PATENT DOCUMENTS

| | | |
|---|---|---|
| JP | 2001-21376 A | 1/2001 |
| JP | 2002-257567 | 9/2002 |
| WO | WO 99/01855 | 1/1999 |

* cited by examiner

*Primary Examiner*—Khoi H. Tran
*Assistant Examiner*—Marie A Weiskopf
(74) *Attorney, Agent, or Firm*—Birch, Stewart, Kolasch & Birch, LLP

(57) ABSTRACT

An in-vehicle navigation device in which a route search block outputs a search result of a guiding route from an exit of the expressway to an entrance of the expressway by way of the selected facility to a display block to make the display block display the search result in a case where a present position detected by a present position detection block is on an expressway and where position of a target facility selected by a facility information selection block is outside the expressway.

21 Claims, 13 Drawing Sheets

IN-VEHICLE NAVIGATION DEVICE

This Nonprovisional application claims priority under 35 U.S.C. § 119(a) on Patent Application No(s). 2003-051316 filed in JAPAN on Feb. 27, 2004, the entire contents of which are hereby incorporated by reference.

BACKGROUND OF THE INVENTION

1. Field of the Invention

The present invention relates to an in-vehicle navigation device for guiding driving of a vehicle and in particular to an in-vehicle navigation device for guiding driving of a vehicle running on an expressway.

2. Description of the Related Art

Among in-vehicle navigation devices proposed in the related art there is a device that performs a search, while the vehicle is running on an expressway, for facilities which are located within a specified distance from a next exit of the expressway and facilities which are located along a guiding way and within a specified distance from the vehicle to display them. The in-vehicle navigation device proposed in the related art has a configuration including: a vehicle position detection unit for detecting the present position of the vehicle; a map data storage unit for storing map data including exits of expressways and facilities; a facility search unit that searches facilities located within a predetermined distance from the next exit of the expressway from the map data on the basis of the vehicle position detected by the vehicle position detection unit while the vehicle is running on an expressway; and a display unit for displaying the facilities searched by the facility search unit. According to this configuration, it is possible to search, while the vehicle is running on the expressway, facilities that can easily be reached from the next exit of the expressway and to display the facilities (for example, see patent document 1).

[Patent Document 1] Japanese Unexamined Patent Publication No. 2001-21376 (paragraph numbers [0001], [0015], [0016])

However, in the above mentioned in-vehicle navigation device proposed in the related art there is a problem that the device can not search a guiding route of the vehicle on which the vehicle returns again to the expressway from a target facility after it reaches the target facility from the exit of the expressway. Since Japanese expressways are available on a chargeable basis, there are hardly cases where a user driving on an expressway utilizes a facility, such as gas station outside the expressway and then again returns to the expressway from the facility. On the other hand, expressways in foreign countries such as European countries and U.S.A. are available on a free of charge basis in addition they have facilities, such as rest rooms but they rarely have facilities of gas station and shops unlike expressways in Japan. For this reason, in countries where expressways are available on a free of charge basis, there are extremely common cases where even if a driver runs on an expressway, the driver utilizes a facility outside the expressway and again returns to the expressway.

Moreover, even in Japan, a fact that public expressways utilized by a large number of vehicles are available on a chargeable basis has become a social problem, so it is sufficiently possible thought that the public expressways will be available on a free of charge basis in future. If the public expressways become available on a free of charge basis, just as with European countries and U.S.A., there are sufficiently possible cases where a driver utilizes a facility outside the expressway and then again returns to the expressway.

SUMMARY OF THE INVENTION

The present invention has been made to solve the above mentioned problem. The object of the invention is to provide an in-vehicle navigation device capable of performing a search for a guiding route while driving on an expressway in a case where a driver utilizes a facility outside the expressway and then again returns to the expressway from the facility.

An in-vehicle navigation device in accordance with the present invention includes: a facility information designation part for designating information of a facility to be searched; a threshold value setting part for setting a threshold value of a search criterion of the facility; a present position detection block for detecting a present position of a vehicle; a facility information selection block for selecting the facility satisfying the threshold value set by the threshold value setting part among information of the facility designated by the facility information designation part; and a route search block that in a case where the present position detected by the present position detection block is on an expressway and where a position of the facility selected by the facility information selection block is outside the expressway, outputs a search result of a guiding route from an exit of the expressway to an entrance of the expressway by way of the selected facility to a specified display block to make the specified display block display the search result.

Thus, according to the present invention, it is possible to produce an effect of performing a search for a guiding route in a case where a driver utilizes a facility outside an expressway and then again returns to the expressway from the facility.

DETAILED DESCRIPTION OF THE PREFERRED EMBODIMENT

Hereinafter a configuration of one preferred embodiment of the present invention will be described with reference to the accompanying drawings.

Embodiment 1

Figure 1:
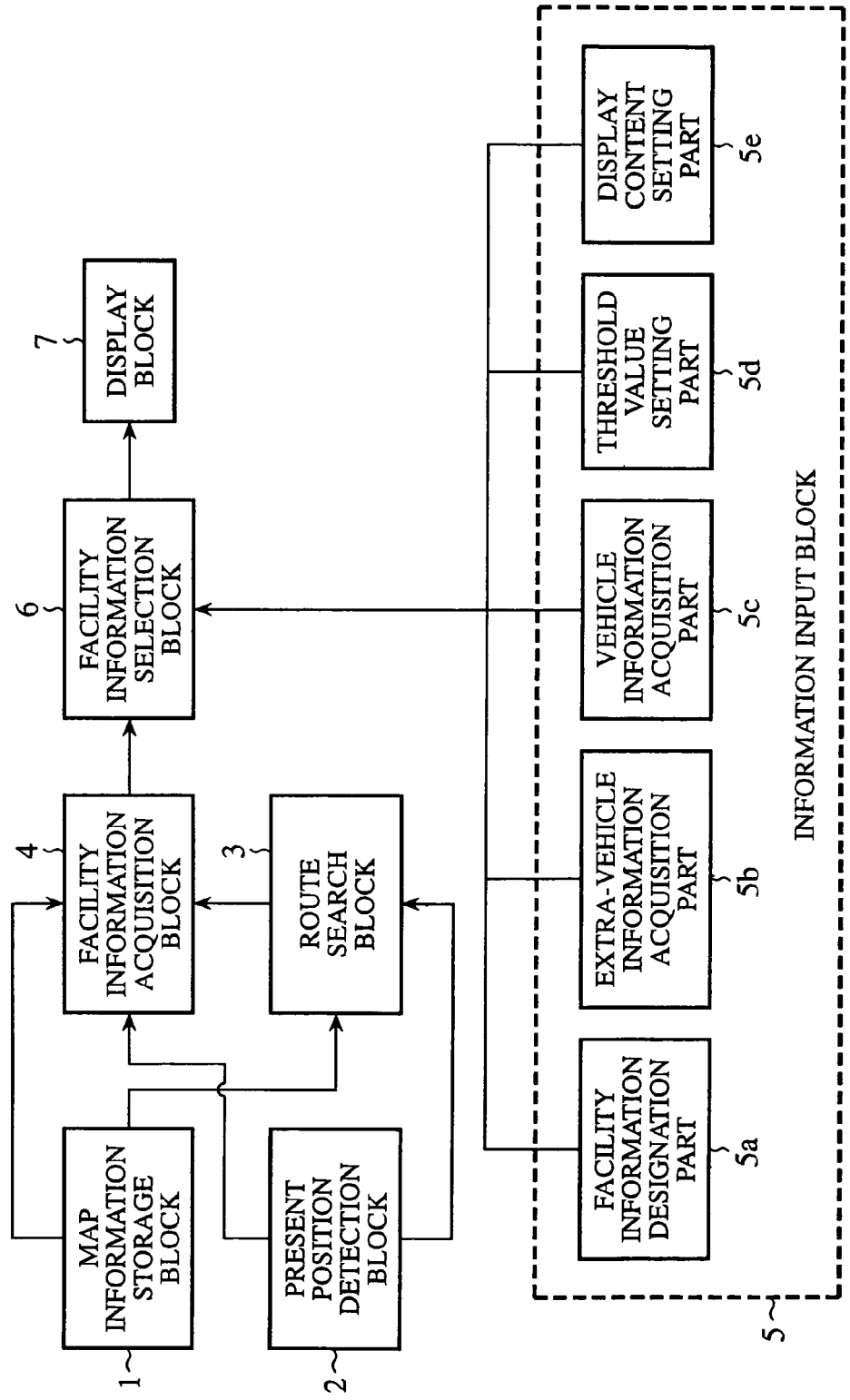
FIG. 1 is a block diagram to show function of an in-vehicle navigation device in embodiment 1 of the present invention.

FIG. 1 is a functional block diagram to show function of an in-vehicle navigation device in embodiment 1 of the present invention. In the drawing, a map information storage block 1 stores map data including map data of the entrances and exits of expressways and map data of facilities located around the entrances and exits. A present position detection block 2 detects the present position of a vehicle as a present position detection block. A route search block 3 searches a driving route according to the present position of the vehicle detected by the present position detection block 2 with reference to the map data obtained from the map information storage block 1. A facility information acquisition block 4 acquires information of search results obtained by a search performed by the route search block 3 with reference to map data obtained from the map information storage block 1 and facilities exiting around the present position of the vehicle detected by the present position detection block 2. An information input block 5 inputs various kinds of information for searching guiding routes. A facility information selection block 6 selects facilities which is appropriate for information input by the information input block 5 among the information of search results acquired by the facility information acquisition block 4. A display block 7 displays search results of information relating to the facilities selected and output by the facility information selection block 6.

The information input block 5 in FIG. 1 is composed of a facility information designation part 5a, an extra-vehicle information acquisition part 5b, a vehicle information acquisition part 5c, a threshold value setting part 5d and a display content setting part 5e. The facility information designation part 5a designates information of facilities to be searched according to the operation of user. For example, the facility information designation part 5a designates information of facilities such as gas station, hotel, bank, convenience store, fast food shop and so on, according to the operation of user and inputs the information to the facility information selection block 6. The extra-vehicle information acquisition part 5b inputs road traffic information acquired from outside to the facility information selection block 6. The vehicle information acquisition part 5c acquires information of the remaining amount of fuel and abnormality detection information detected in, for example, an engine and the like and inputs them including the abnormality detection information, to the facility information selection block 6. The threshold value setting part 5d sets threshold values of search criteria of facilities, that is, limit values such as a running distance and a predicted running time from an exit of an expressway to a facility, a running distance and a predicted running time from the facility to an entrance of the expressway, a running distance and a predicted running time from a facility to another facility, according to the operation of user and inputs the threshold values to the facility information selection block 6. While basic threshold values which can be thought as average, are previously set at the time of factory shipment for each of the countries to which the navigation devices are shipped, by the threshold value setting part 5d, user can changes these basic threshold values to more preferable ones according to the operation. The display content setting part 5e changes, according to the operation of user, the order of display as priority or the necessity of display of a plurality of facilities to be displayed by the display block 7 and sets a part of search results to be highlighted.

Figure 2:
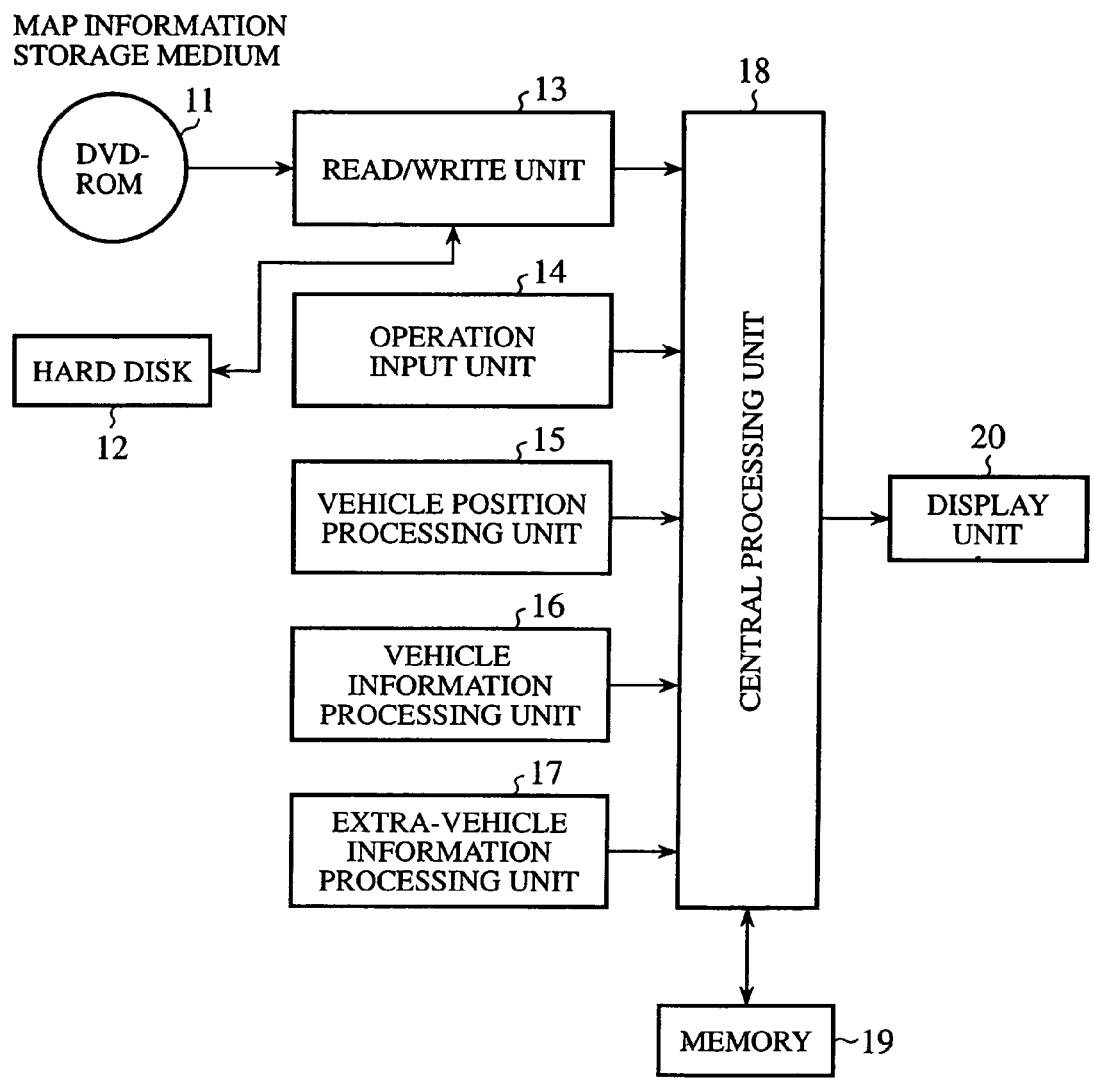
FIG. 2 is a block diagram to show a configuration of hardware for realizing the function of the in-vehicle navigation device in FIG. 1.

FIG. 2 is a block diagram to show the configuration of hardware realizing the function of the in-vehicle navigation device in FIG. 1. A DVD-ROM 11 or a hard disk 12 is a map information storage medium corresponding to the map information storage block 1 in FIG. 1. The DVD-ROM 11 or the hard disk 12 stores navigation control programs and the basic threshold values and other initial values that are previously set at the time of factory shipment for respective countries to which the navigation devices are shipped. A read/write unit 13 corresponds to the facility information acquisition block 4 in FIG. 1 and reads the map data in the DVD-ROM 11 or the hard disk 12 and the control programs and the threshold values in the DVD-ROM 11 or the hard disk 12 and when new threshold values are set by the threshold value setting part 5d, the read/write unit 13 writes the threshold values to the hard disk 12 or a memory 19. An operation input unit 14 corresponds to the facility information designation part 5a, the threshold value setting part 5d, and the display content setting part 5e in FIG. 1 and acquires information which corresponds to the operation of user. A vehicle position processing unit 15 corresponds to the present position detection block 2 in FIG. 1 and detects the present position of the vehicle by use of a GPS receiver, a vehicle speed sensor, a gyro sensor and the like. A vehicle information processing unit 16 corresponds to the vehicle information acquisition part 5c in FIG. 1 and acquires information of the remaining amount of fuel and the abnormality detection information. An extra-vehicle information processing unit 17 corresponds to the extra-vehicle information acquisition part 5b in FIG. 1 and has a VICS receiver for receiving road traffic information such as traffic jam information, road construction information, and accident information from a VICS (Vehicle Information and Communication System). A central processing unit 18 corresponds to the route search block 3 and the facility information selection block 6 in FIG. 1 and executes the control programs that are read by the read/write unit 13 from the hard disk 12 or the memory 19 and processes information input by the operation input unit 14, the vehicle position processing unit 15, the vehicle information processing unit 16 and the extra-vehicle information processing unit 17. The memory 19 is composed of a RAM or the like and temporarily stores information to be processed by the central pressing unit 18. A display unit 20 corresponds to the display block 7 in FIG. 1 and displays the map data and the search results output by the central processing unit 18 and at the same time it compose a touch panel on which arbitrary positions on a screen can be touched by a finger or designated by a remote controller. Thus, this touch panel corresponds to the display content setting part 5e in FIG. 1.

Figure 3:
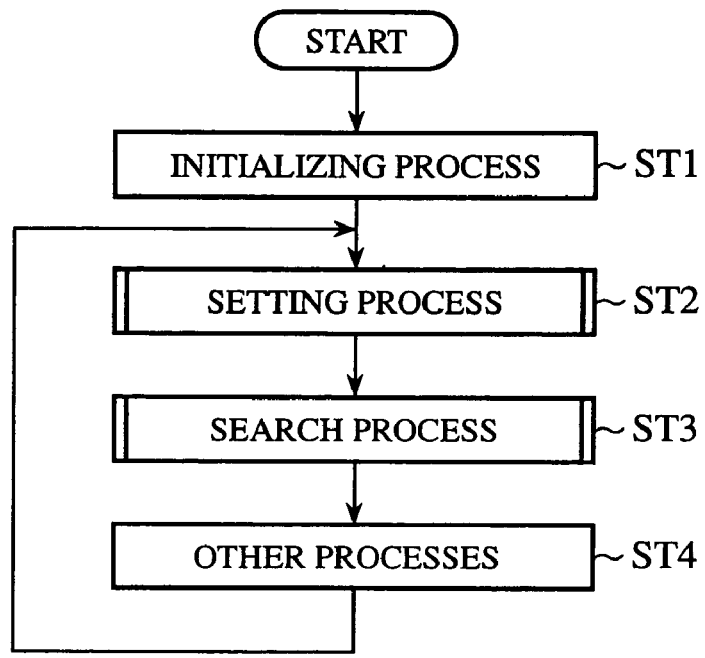
FIG. 3 is a main flow chart of a control program executed by the central processing unit in FIG. 2.
Figure 4:
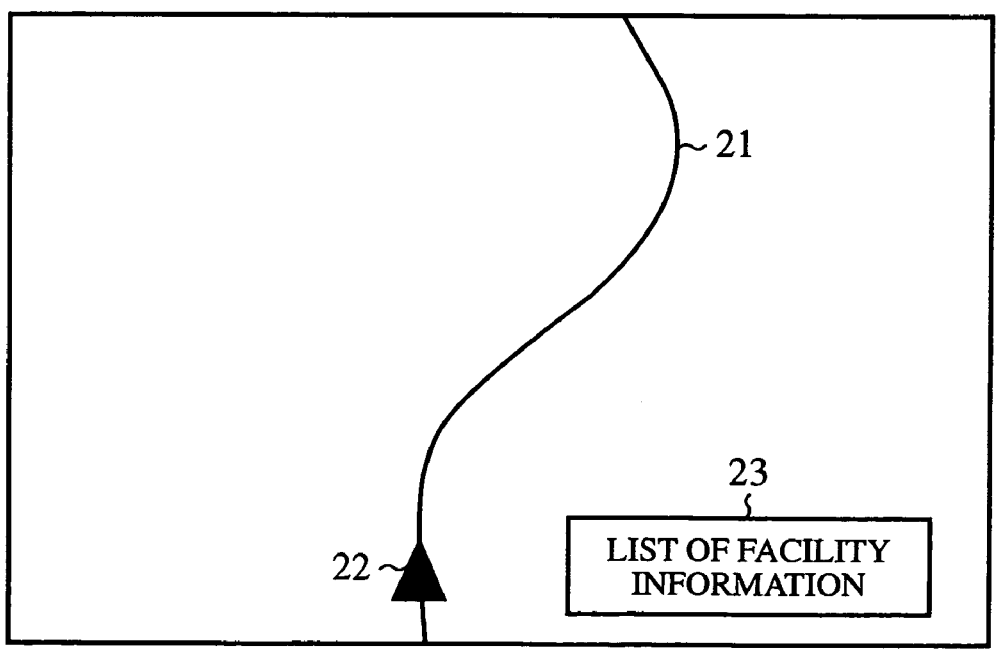
FIG. 4 is a diagram to show an example of initial screen displayed on the display unit in FIG. 2.

FIG. 3 is a main flow chart of the control programs executed by the central processing unit in FIG. 2. First, an initializing process is performed (step ST1). In this initializing process, the read/write unit 13 reads map data corresponding to the present position input by the vehicle position processing unit 15 from the DVD-ROM 11 and displays an initial screen on the display unit 20. FIG. 4 is a diagram to show an example of the initial screen displayed on the display unit 20. On the screen in FIG. 4 there are displayed an expressway 21 on which a vehicle is running, a mark 22 for indicating the present position of the vehicle, and an icon 23 for a list of facility information. After the initializing process at step ST1 has been completed, a setting process for setting a target facility to be searched (step ST2), a search process (step ST3) for searching a set facility, and other processes (step ST4) are repeatedly performed.

Figure 5:
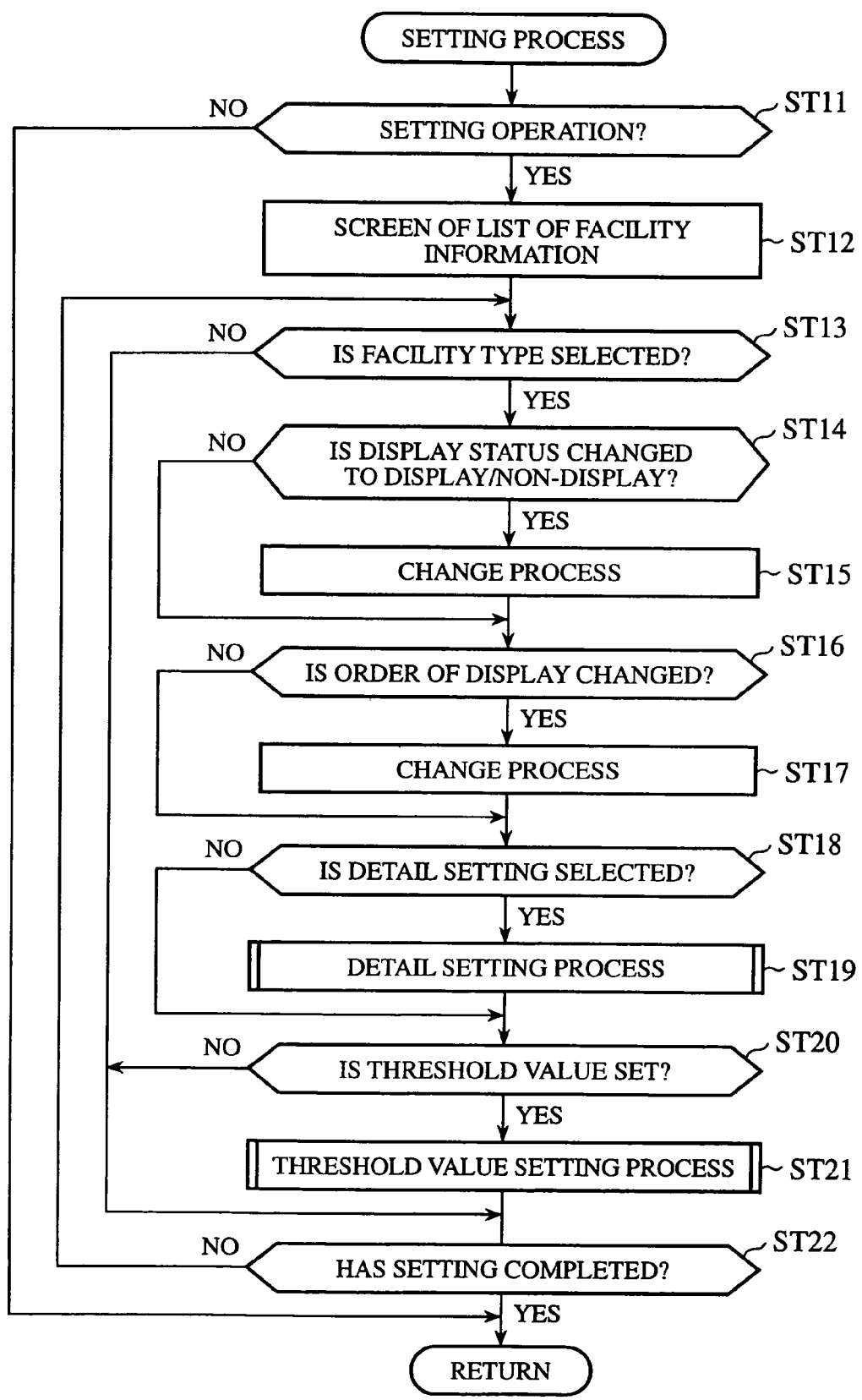
FIG. 5 is a flow chart of a setting process of the main flow chart in FIG. 3.
Figure 6:
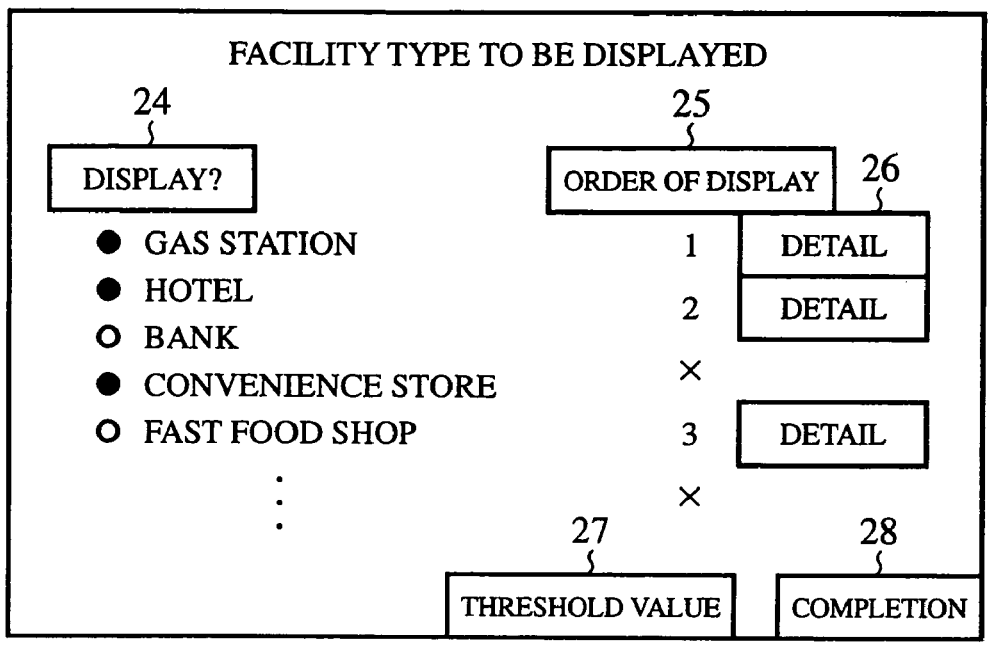
FIG. 6 is a diagram to shown an example of screen of a list of facility information displayed on the display unit in FIG. 2.

FIG. 5 is a flow chart of the setting process of the main flow in FIG. 3. First, it is determined whether a setting operation is ordered (step ST11). The setting operation is ordered by touching on operation of the icon 23 for a list of facility information on the screen in FIG. 4. When the setting operation is ordered, a screen of a list of facility information is displayed (step ST12). FIG. 6 is a diagram to show an example of the screen of a list of facility information displayed on the display unit 20. On the screen in FIG. 6 there are displayed gas station, hotel, bank, convenience store, fast food shop and the like as facility types, an icon 24 for selecting whether data is displayed or not, an icon 25 for setting the order of display as priority, icons 26 for setting details, an icon 27 for setting threshold values, and an icon 28 for setting the completion of setting.

Next, it is determined whether a facility type is selected by operation of the user (step ST13). When any one of facility type is selected, it is determined whether an operation of changing display status of the facility type to "display" or "non-display" is performed by touching on operation of the icon 24 (step ST14) and when the operation of changing the display status of the facility type is performed, a change process according to the operation is performed (step ST15). When the display status of the selected facility type is changed from "non-display" to "display", the content of change is stored in the memory 19 and at the same time a non-display mark "○" of the facility type is changed to a display mark "●". On the other hand, when the display status of the selected facility type is changed from "display" to "non-display", the content of change is stored in the memory 19 and at the same time the display mark of the facility type is changed to a non-display mark.

After the change process at step ST15 has been completed, or in a case where the operation of changing the display status of the facility type to "display" or "non-display" is not performed at step ST14, it is determined whether an operation of changing the order of display of the facility type to be displayed is performed (step ST16), and when the operation of changing the order of display is performed, a change process according to the operation is performed (step ST17). That is, the present number of order of display as priority is changed to a set number and the set number is stored in the memory 19 and at the same time the present displayed number is changed to the set number. In the example of FIG. 6, a gas station having the highest priority of "1" is displayed at the first place, a hotel having the second highest priority of "2" is displayed at the second place, and a convenience store having the third highest priority of "3" is displayed at the third place. Here, marks "x" are displayed at the positions of order of display of the facility types of "non-display" (in FIG. 6, bank and fast food shop).

Next, it is determined whether detail setting of the facility type corresponding to the icon 26 which is selected by touching on, is selected, by touching operation of the icon 26 associated with the displayed facility type (step ST18) and when the detail setting is selected, the detail setting process is performed (step ST19). An example of operation of the detail setting process will be described later in detail. After the detail setting process has been completed or in a case where the detail setting is not selected at step ST18, it is determined whether threshold value setting is selected by touching on operation of the icon 27 (step ST20). When the threshold value setting is selected, a threshold value setting process is performed (step ST21). An example of operation of the threshold value setting process will be described later in detail.

After the threshold value setting process has been completed or in a case where the threshold value setting is not selected at step ST20 or in a case where the facility type is not selected at step 13, it is determined whether an operation of the completion of setting is performed by touching on operation of the icon 28 on the screen (step ST22). In a case where an operation of the completion of setting is not performed, the program proceeds to step ST13 where it is determined whether the facility type is selected. In a case where an operation of the completion of setting is performed, the program is returned to the main flow in FIG. 3.

Figure 8:
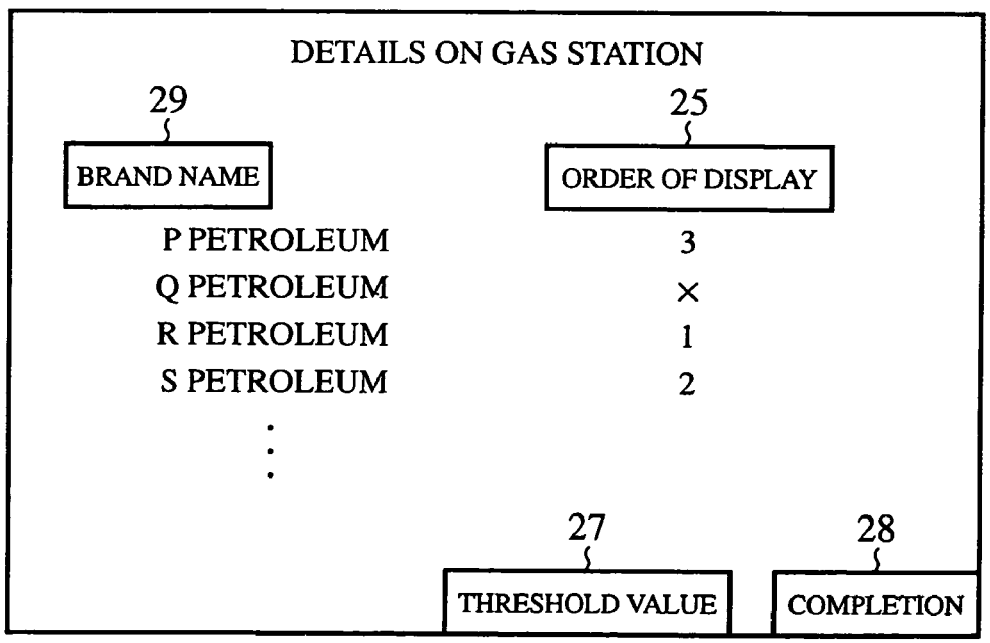
FIG. 8 is a diagram to shown an example of a detail information screen of gas stations displayed on the display unit.
Figure 7:
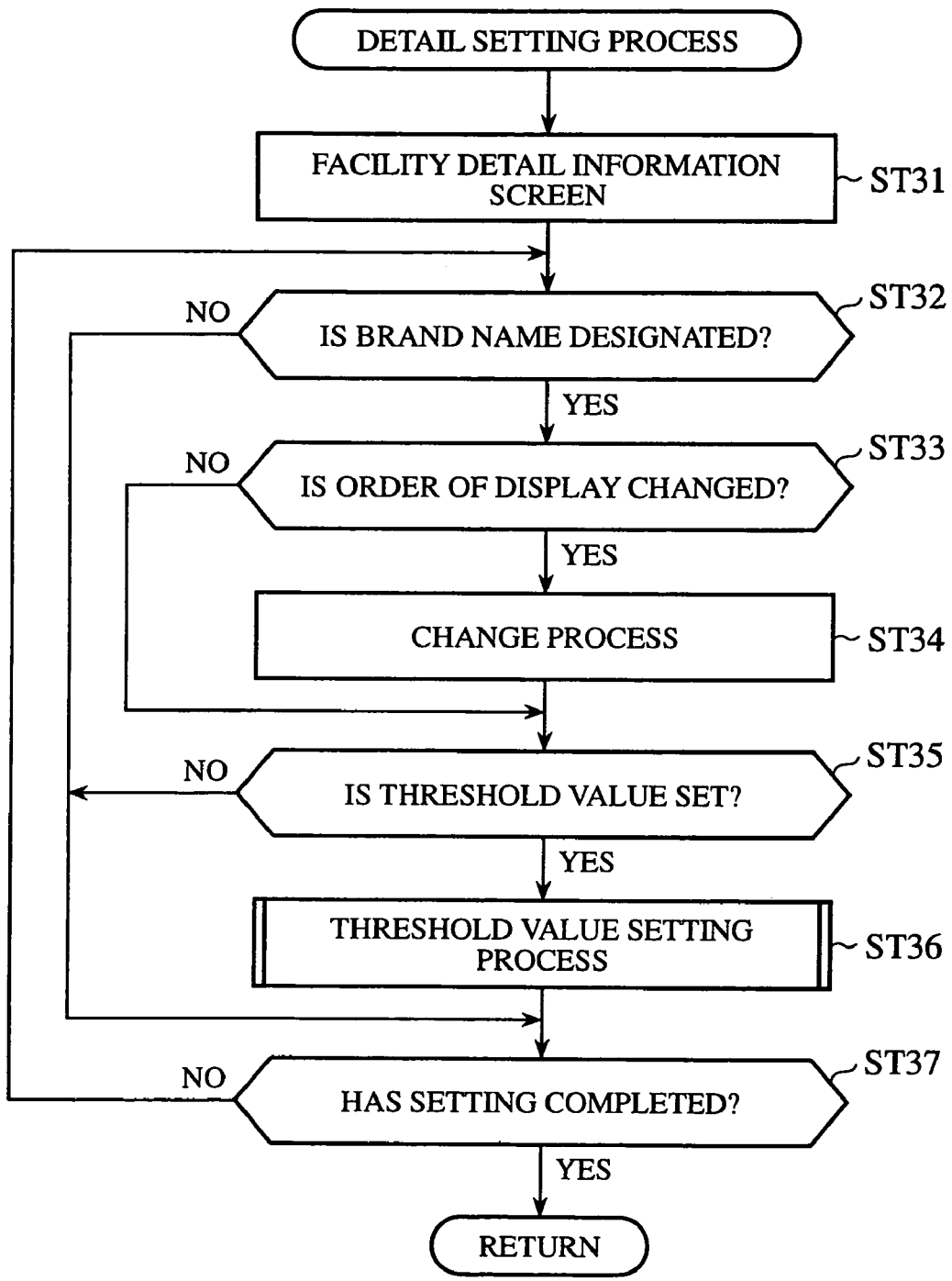
FIG. 7 is a flow chart of a detail setting process in the setting process in FIG. 5.

FIG. 7 is a flow chart of the detail setting process in the setting process in FIG. 5. First, a facility detail information screen of facility type which is selected as detail setting, is displayed (step ST31). FIG. 8 is a diagram to show an example of a detail information screen of a gas station selected as for detail setting. On the screen in FIG. 8 there are displayed brand names (such as P petroleum, Q petroleum and the like) of a plurality of gas stations and an icon 29 for designating brand names and, just as with the screen in FIG. 6, the icon 25 for setting the order of display, the icon 27 for setting threshold values, and the icon 28 for setting the completion of setting.

Next, it is determined whether brand names are designated by touching on operation of the icon 29 or by selecting operation of a facility (step ST32). When a brand name is designated, it is determined whether the order of display is changed by touching on operation of the icon 25 (step ST33) and when the operation of changing the order of display is performed, a change process according to the operation is performed (step ST34). That is to say, the present number of the order of display is changed to a set number and the set number is stored in the memory 19 and the present displayed number is changed to the set number.

After the change process of step ST34 has been completed or in a case where the order of display is not changed at step ST33, it is determined whether threshold value setting is selected by touching on operation of the icon 27 (step ST35). When the threshold value setting is selected, a threshold value setting process is performed (step ST36). An example of operation of the threshold value setting process will be described later in detail. After the threshold value setting process has been completed or in a case where the threshold value setting is not selected at step ST35 or in a case where a brand name is not designated at step ST32, it is determined whether an operation of the completion of setting is performed by touching on operation of the icon 28 on the screen (step ST37). In a case where an operation of the completion of setting is not performed, the program proceeds to step ST32 where it is determined whether a brand name is designated. When the operation of a completion of setting has been completed, the program returns to the flow of setting process in FIG. 5.

Figure 9:
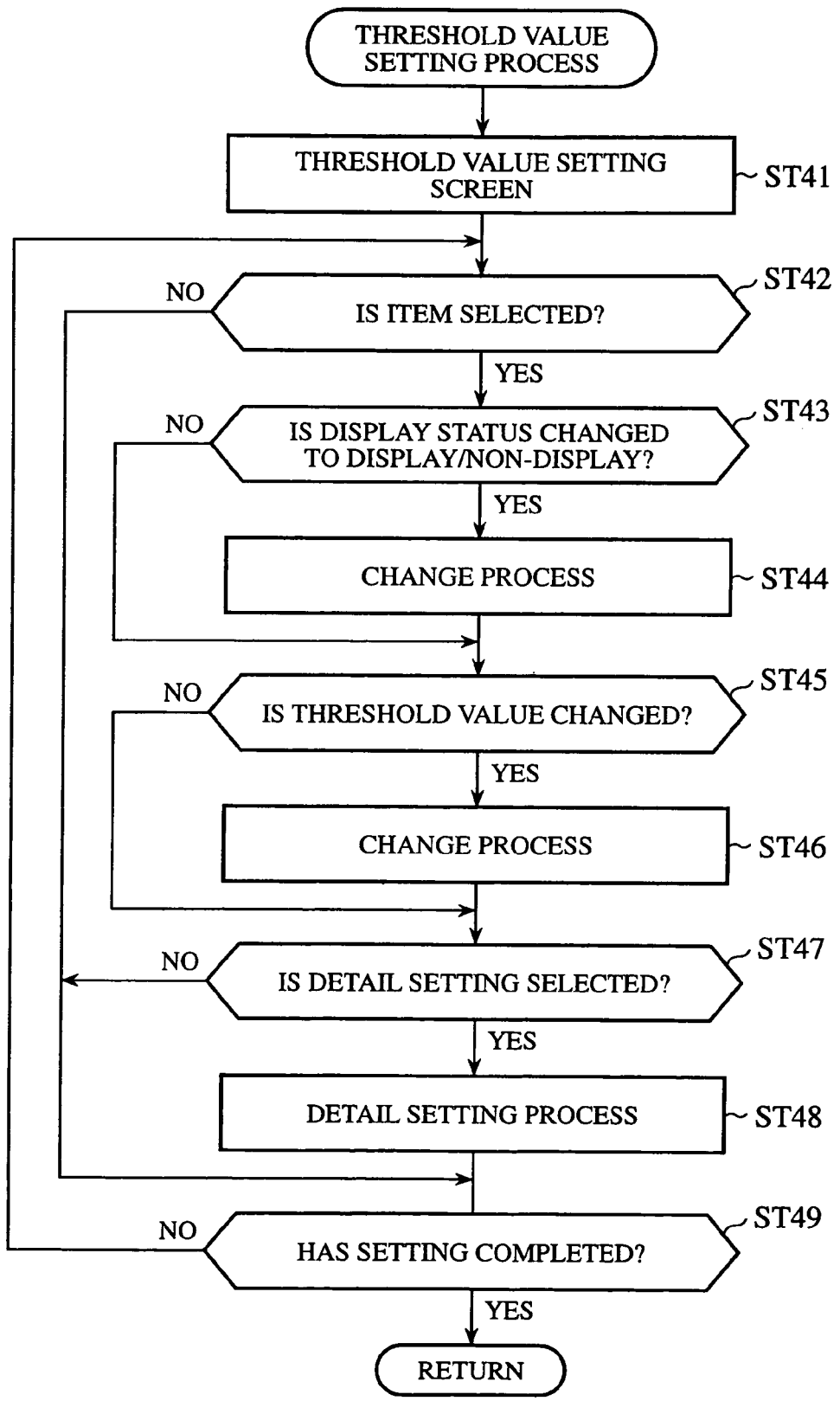
FIG. 9 is a flow chart of a threshold value setting process in FIG. 5 and FIG. 7.

FIG. 9 is a flow chart of the threshold value setting process in the setting process in FIG. 5 and in the detail setting process in FIG. 7. First, a threshold value setting screen is displayed (step ST41). On the threshold value setting screen there are displayed the designated facilities to which threshold values are to be set, the items of the threshold values and present numerical values. Thus, at first, basic threshold values at the time of factory shipment are displayed on the screen. In a case where the threshold value setting process is selected in the setting process in FIG. 5, a plurality of types of facilities are displayed as the designated facilities to which threshold values are to be set. In a case where the threshold value setting process is selected in the detail setting process in FIG. 7, a plurality of brand names of the same type are displayed as the designated facilities to which threshold values are to be set.

Figure 10:
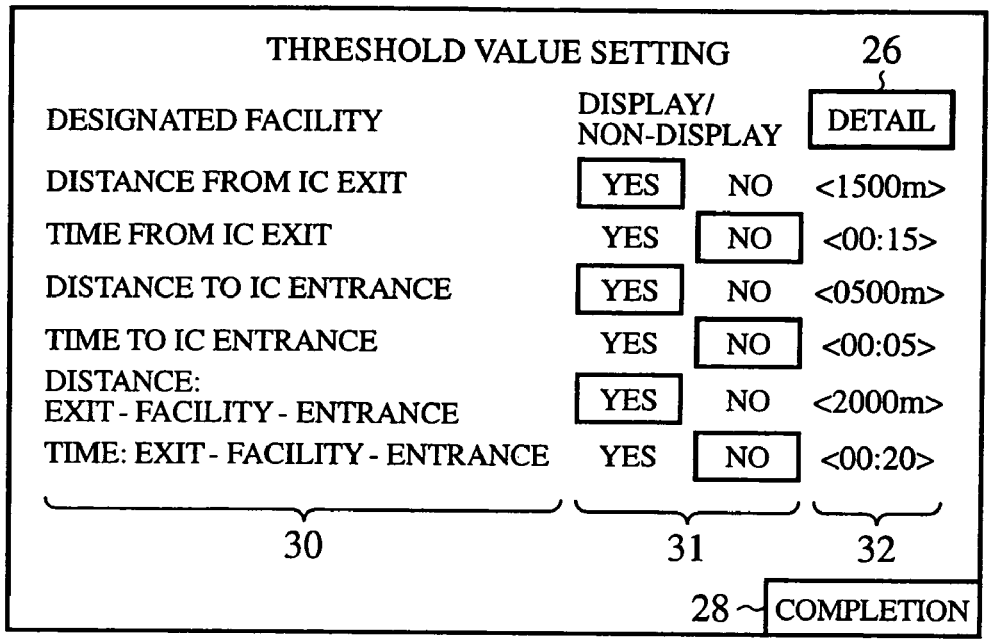
FIG. 10 is a diagram to show an example of threshold value setting screen displayed on the display unit.

FIG. 10 is a diagram to show an example of a threshold value setting screen. On this screen there are displayed items 30 which includes a running distance from an IC (expressway interchange) exit to a facility, a predicted running time from the IC exit to the facility, a running distance from the facility to an IC entrance, a predicted running time from the facility to the IC entrance, a total running distance from the IC exit to the IC entrance by way of the facility, and a total predicted running time from the IC exit to the IC entrance by way of the facility. Moreover, YES/NO icons 31 for selecting whether item is displayed or not for the respective items, numerical value data 32 of the threshold values for the respective items, and an icon 28 of setting the completion of setting are displayed on the screen.

Next, it is determined whether any items are selected (step ST42) and when some items are selected, it is further determined whether the display status of the item is changed to "display" or "non-display" by touching on operation of the icon 31 (step ST43). When an operation of changing the display status of the items is performed, a change process according to the operation is performed (step ST44). That is, the contents changed in the selected items are stored in the memory 19 and the framed icon images of the icon 31 are changed to "YES" or "NO".

After the change process of changing the display status of the items to "display" or "non-display" has been completed at step ST44 or in a case where the display status of the items are not changed to "display" or "non-display" at step ST43, it is determined whether threshold values are changed (step ST45). When an operation of changing the threshold values is performed, a change process according to the operation is performed (step ST46). That is to say, the present threshold numerical values are changed to the set numerical values and the set numerical values are stored in the memory 19 and the present displayed numerical values are changed to the set numerical values.

In the example shown in FIG. 10, the threshold values of the running distance are displayed. In usual case while the threshold values of either one of the running distance or the predicted running time is displayed, the threshold values of both of them can be displayed.

After the change process of the threshold value has been completed at step ST46 or in a case whether the threshold value is not changed at step ST45, it is determined whether detail setting is selected by touching on operation of the icon 26 (step ST47). When the detail setting is selected, a detail setting process is performed (step ST48). In this detail setting process, for example, the width of a road on which the vehicle runs is designated or a road bypassing facilities such as hospital and school is designated.

After the detail setting process has been completed at step ST48 or in a case whether the detail setting is not selected at step ST47 or in a case where any item is not selected at step ST42, it is determined whether the completion of setting is selected by touching on operation of the icon 28 (step ST49). When the completion of setting is not selected, the program proceeds to step ST42 where it is determined whether any item is selected. When the completion of setting is selected, the program returns to the setting process flow in FIG. 5 or the detail setting process flow in FIG. 7.

Figure 11:
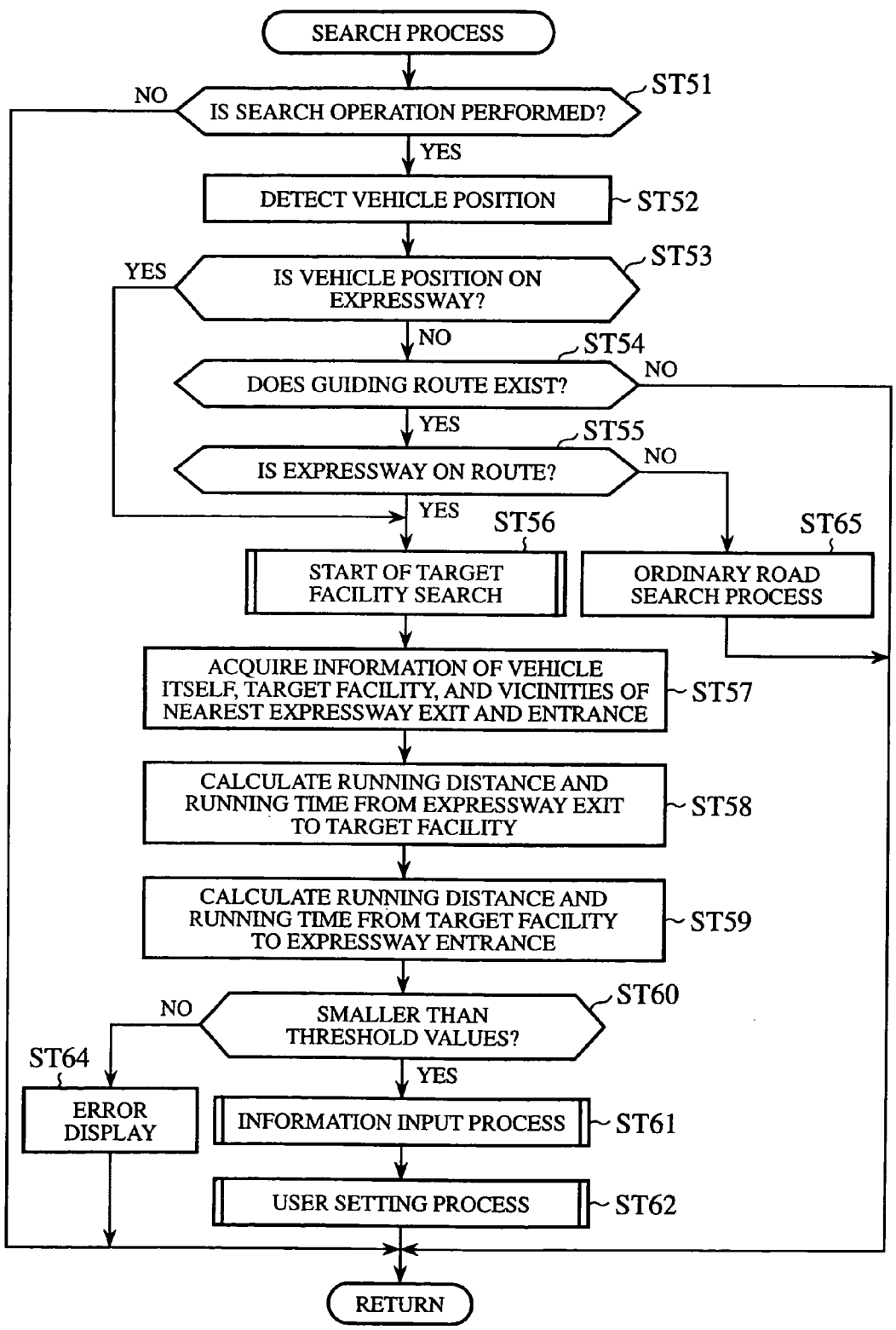
FIG. 11 is a flow chart of a search process of the main flow chart in FIG. 3.

FIG. 11 is a flow chart of the search process of the main flow chart in FIG. 3. First, it is determined whether a search operation is performed (step 51). In a case where this search operation is not performed, the program returns to the main flow, whereas when the operation is performed, a vehicle position is detected (step ST52). Then, it is determined whether the detected vehicle position is on an expressway (step ST53). In a case where the detected vehicle position is not on the expressway, it is determined whether there is a guiding route (step ST54). Then, in a case where there is a guiding route, it is determined whether an expressway is included in (hereinafter it is also called as "expressway is on") the guiding route (step ST55).

In a case where the vehicle position is on the expressway at step ST53 or in a case where the expressway is on the present guiding route at step ST55, a search process of target facilities is started (step ST56). A process of start of a target facility search will be described later in detail. After the process of start of a target facility search has been completed, the information of the vehicle itself, a target facility and vicinities of the nearest IC entrance and IC exit of the expressway is acquired (step ST57). Next, a running distance and a predicted running time from the IC exit to the target facility are calculated (step ST58). Further, a running distance and a predicted running time from the target facility to the IC entrance are calculated (step ST59).

Next, it is determined whether the calculated running distance and predicted running time are smaller than the threshold values (step ST60). In a case where the calculated running distance and predicted running time are smaller than the threshold values, an information input process is performed (step ST61). That is, various kinds of information acquired by the information acquisition block 5 in FIG. 1 is input. To be more specific, abnormality detection information when an abnormality such as engine trouble is detected and information of the remaining amount of fuel are input by the vehicle information processing unit 16 in FIG. 2 and the information of traffic jam and business hours of the target facility is input by the extra-vehicle information processing unit 17. After the information input process has been completed, a user setting process for processing the setting operation performed by the user is performed (step ST62). Then, the program returns to the main flow in FIG. 3.

In this regard, a detailed operation of the information input process at step ST61 and a detailed operation of the user setting process at step ST62 will be described later in detail.

In a case where the calculated running distances and predicted running times of all of the searched facilities exceed threshold values at step ST60, an error display of displaying a message as such is performed (step ST64) and the program returns to the main flow in FIG. 3. Then, in a case where there is no any guiding route at step ST54, a search can not be performed and hence the program returns to the main flow in FIG. 3. Moreover, in a case where an expressway is not on a guiding route at step ST55, a search process of ordinary roads is preformed (step ST65) and the program returns to the main flow in FIG. 3.

Figure 12:
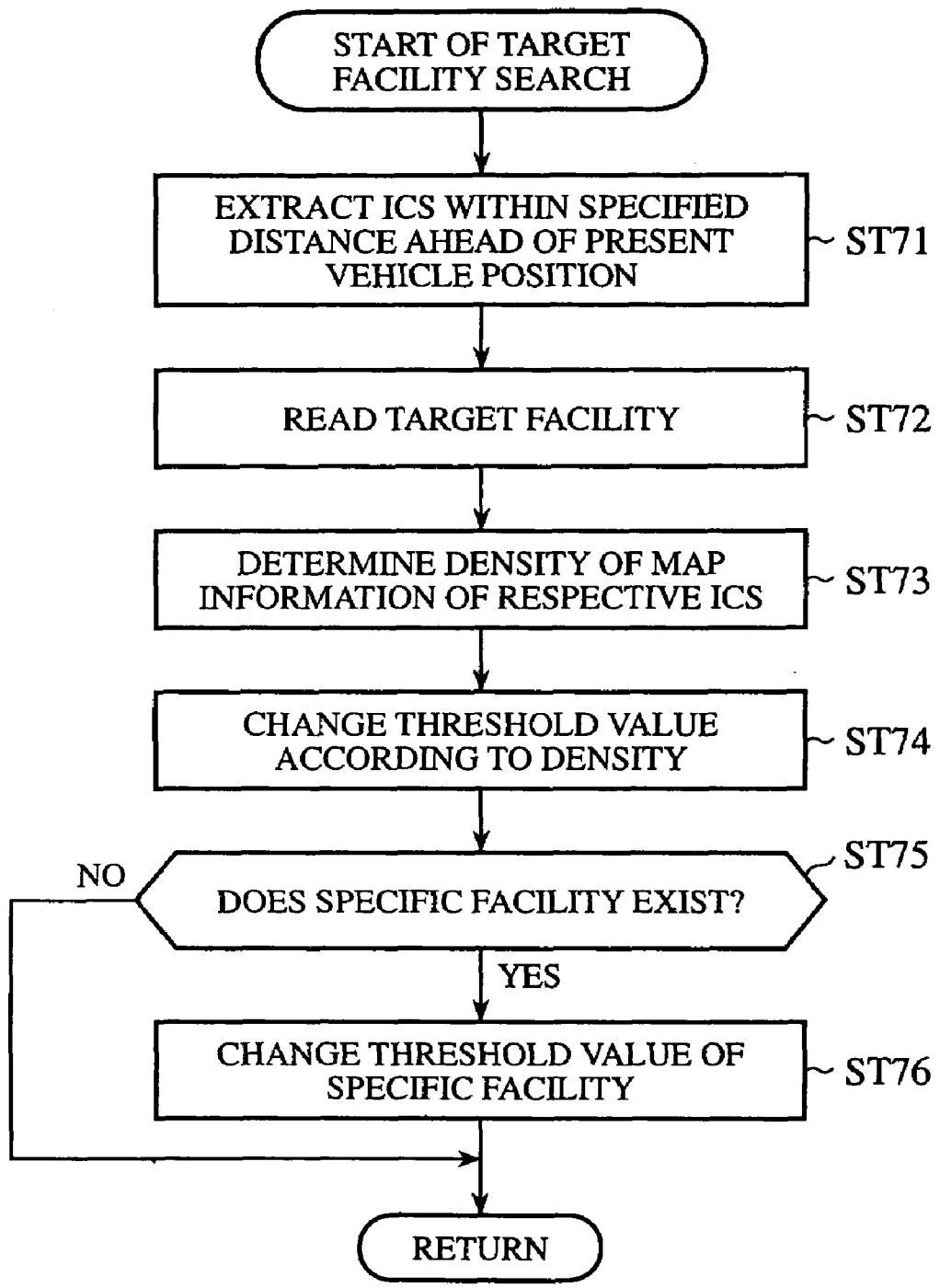
FIG. 12 is a flow chart of start of a target facility search in the search process in FIG. 11.

FIG. 12 is a flow chart of the process of start of a target facility search at step ST56 in the search process in FIG. 11. First, ICs (expressway interchange) and SAs (service area) located within a specified distance ahead of the present vehicle position are extracted (step ST71). For example, ICs and SAs located within 2 km, 10 km, 50 km, and 100 km ahead of the present vehicle position are extracted. In a case where the vehicle is running, every time the vehicle runs a unit running distance (for example, several hundreds m), the ICs and the SAs are extracted. Next, the information of the target facilities set in the memory 19 in FIG. 2 is read (step ST72). For example, in a case where the target facilities designated by the user are gas station, bank and fast food shop, the identification data of them are read from the memory 19.

Next, density of the map information of vicinities of the respective ICs and the like is determined with reference to the DVD-ROM 11 in FIG. 2 (step ST73). The density of map information is higher in urban areas than a basic density and lower in suburban areas than the basic density, so by determining the density of map information, it is possible to determine whether an area near the IC is an urban area or a suburban area. Then, threshold values are changed according to the density of map information of the vicinities of the respective ICs (step ST74). That is to say, in a case where the areas near the respective ICs are urban areas, the threshold values are changed to smaller values and in a case where the areas near the respective ICs are suburban areas, the threshold values are changed to larger values.

Next, it is determined whether the target facilities include a specific facility (step ST75). For example, it is determined whether the target facilities include a gas station or a bank of a specific brand name designated by the user. In a case where the target facilities include the specific facilities, the threshold values are also changed (step ST76). That is, the threshold values of the specific facilities are changed to values larger than the facilities of the other brand names to expand a search range of the specific facilities. Then, when the start of a target facility search has been completed, the program returns to the flow in FIG. 11.

Figure 13:
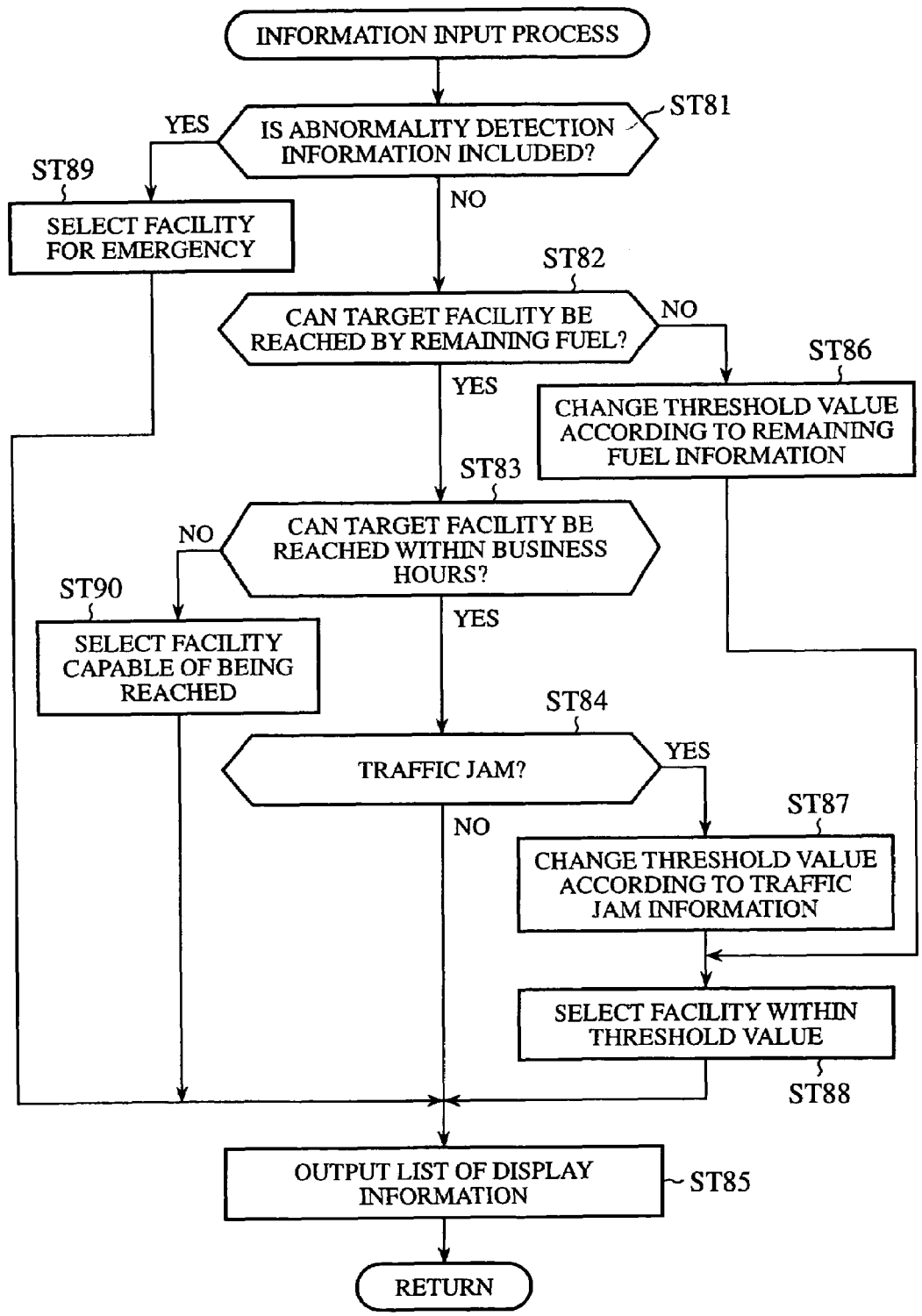
FIG. 13 is a flow chart of an information input process in the search process in FIG. 11.

FIG. 13 is a flow chart of the information input process at step ST61 in the flow in FIG. 11. First, it is determined whether abnormality detection information such as engine trouble is included (step ST81). In a case where the abnormality detection information such as engine trouble is not included, it is determined whether the target facility can be reached by the remaining amount of fuel (step ST82). In a case where the target facility can be reached by the remaining amount of fuel, it is determined whether the target facility can be reached within business hours of the target facility (step ST83) In a case where the target facility can be reached within business hours of the target facility, it is determined whether there occurs a traffic jam on the guiding route (step ST84). In a case where a traffic jam does not occur, a list of display information is output to and displayed on the display unit 20 in FIG. 2 (step ST85). Then, the program returns to the search process flow in FIG. 11 and proceeds to step ST62.

In a case where the target facility can not be reached by the remaining amount of fuel at step ST82, the threshold value of running distance is changed to a smaller value within a range capable of being reached according to the information of the remaining amount of fuel (step ST86). Then, in a case where a traffic jam occurs on the guiding route ahead at step ST84, the threshold value of predicted running time is changed to a larger value in a range capable of being reached according to the information of traffic jam (step ST87). After the threshold value is changed at step ST86 or at step 87, facilities within the changed threshold values are selected from among the target facilities (step ST88). Then, a list of display information of the selected facilities is output to and displayed on the display unit 20 in FIG. 2 (step ST85). Then, the program returns to the search process flow in FIG. 11 and proceeds to step ST62.

In a case where vehicle abnormality information such as engine trouble is input at step ST81, facilities such as car maintenance factory and car dealer are selected (step ST89). Then, a list of display information of the selected facilities is output to and displayed on the display unit 20 in FIG. 2 (step ST85). At this time, an alarm message may be displayed at the same time. In a case where the target facility can not be reached within business hours of the target facility in step ST83, facilities capable of being reached are selected (step ST90). Then, a list of display information of the selected facilities is output to and displayed on the display unit 20 in FIG. 2 (step ST85). Then, the program returns to the search process flow in FIG. 11 and proceeds to step ST62.

Figure 14:
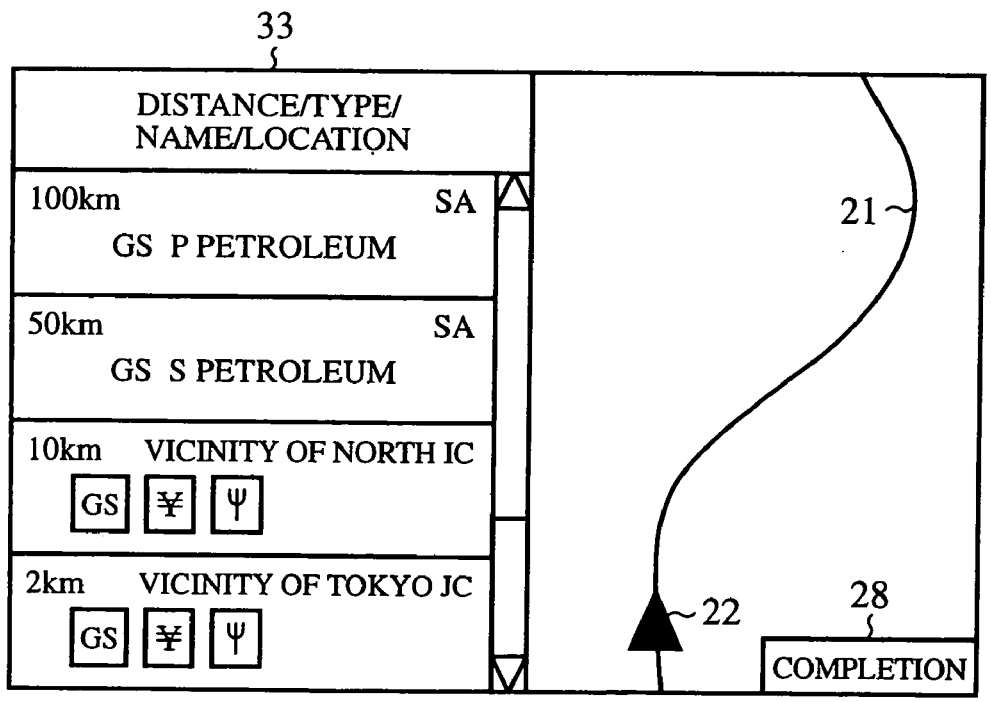
FIG. 14 is a diagram to show an example of list of information displayed on the display unit.

FIG. 14 is a diagram to show an example of screen of a list of information displayed on the display unit 20. On this screen together with an expressway 21 and a present vehicle position mark 22 there is displayed a list 33 of target facilities at locations of 2 km, 10 km, 50 km, and 100 km from the present vehicle position. In a case where there are a large number of locations, they can be displayed by a scroll operation.

Figure 15:
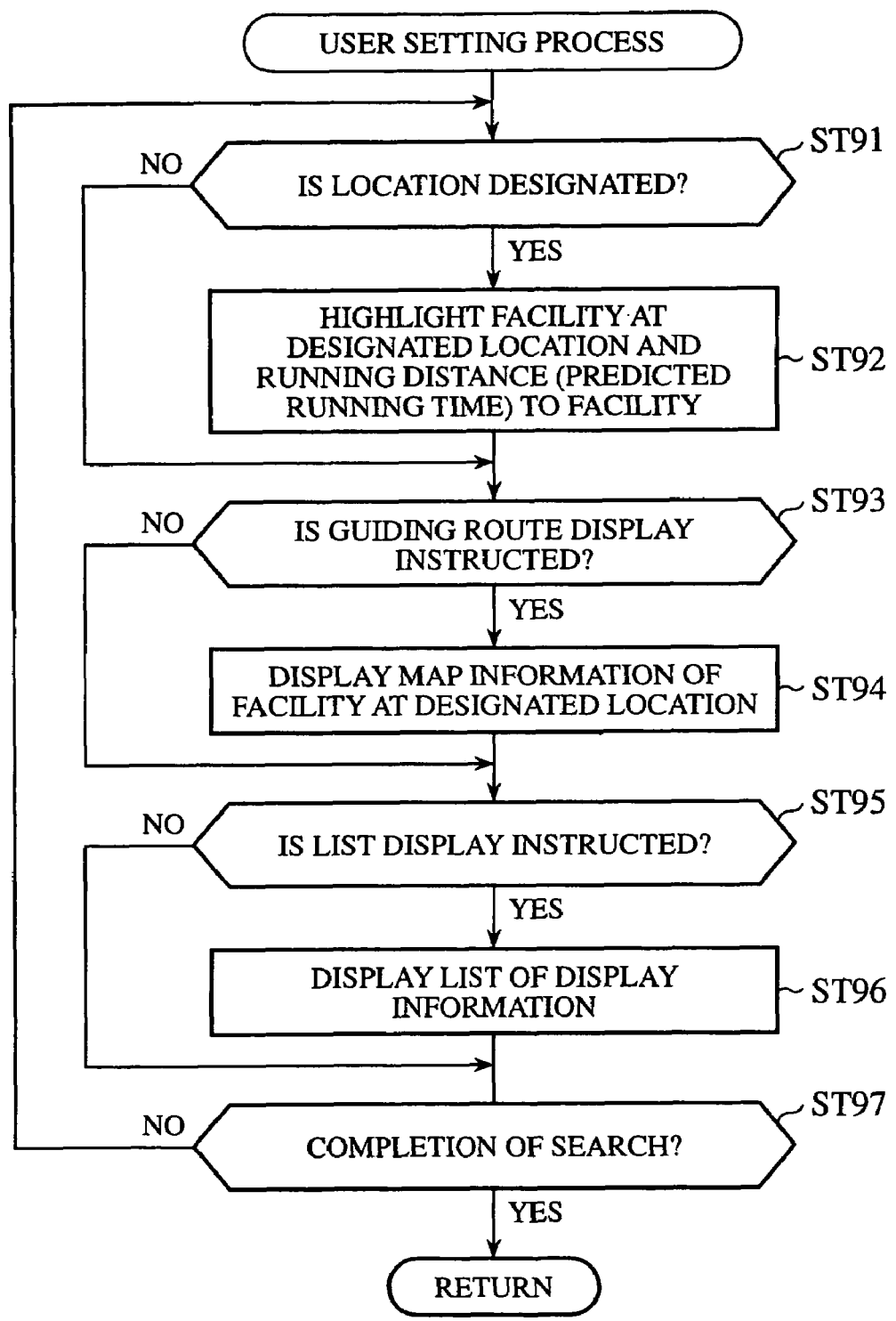
FIG. 15 is a flow chart of a user setting process in the search process in FIG. 11.

FIG. 15 is a flow chart of the user setting process at step ST62 in the search process in FIG. 11. This user setting process switches the display according to the operation of user in a state where the screen of a list of information shown in FIG. 14 is displayed. First, it is determined whether any one location of the list 33 of target facilities is designated (step ST91). That is to say, it is determined whether any one location (in the example in FIG. 14, any one location at 2 km, 10 km, 50 km, and 100 km) of the list 33 of target facilities is designated by a finger touch on a touch panel or a remote controller. When any one location is designated, a facility at the designated location and a running distance or a predicted running time to the facility are highlighted (step ST92).

Figure 16:
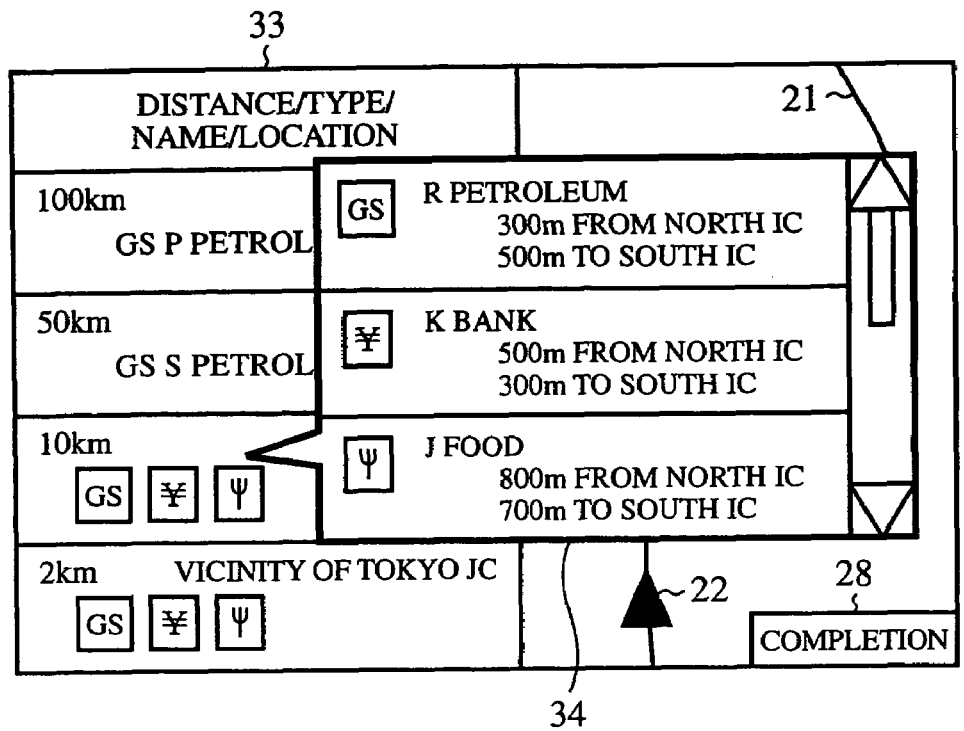
FIG. 16 is a diagram to show an example of facilities highlighted on the display unit.

FIG. 16 is a diagram to show an example of facilities highlighted on the display unit 20. For example, when a location of a north IC at a distance of 10 km is designated on the screen in FIG. 14, as shown in FIG. 16, a plurality of facilities near the north IC such as gas station, bank and fast food shop, and running distances from the north IC exit to the respective facilities and running distances from the respective facilities to a south IC entrance are displayed in a highlighted and framed image 34. In a case where there are a large number of facilities, they can be displayed by a scroll operation.

Next, it is determined whether it is instructed to display a guiding route (step ST93). For example, it is determined whether the highlighted framed image 34 shown in FIG. 16 is made on and designated. When it is instructed to display a guiding route, the map information of the facility at the designated location is displayed (step ST94).

Figure 17:
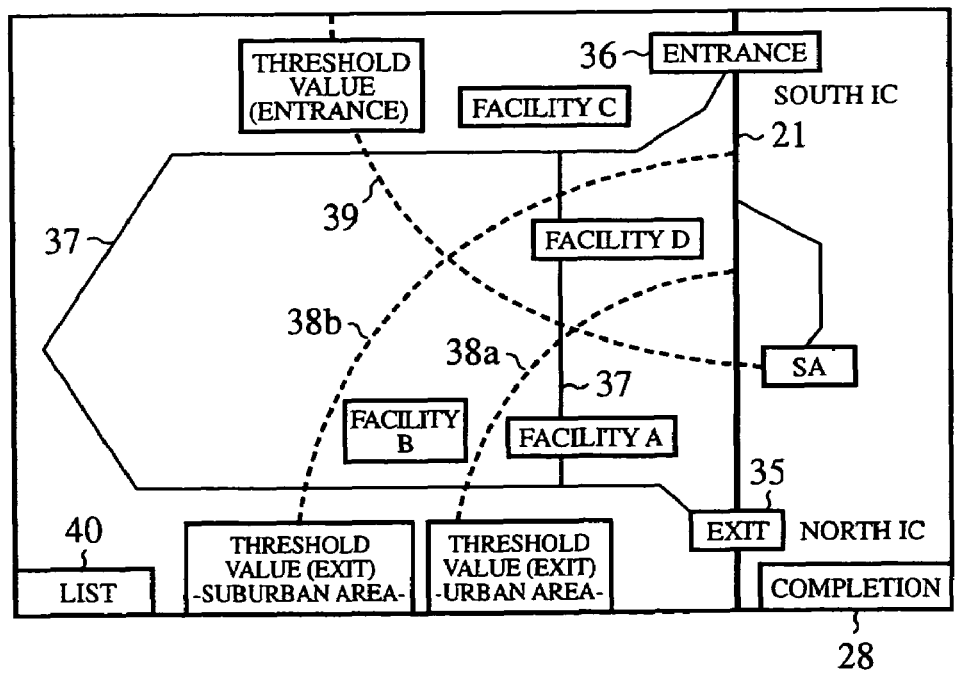
FIG. 17 is a diagram to show an example of map information of facilities at designated locations displayed on the display unit.

FIG. 17 is a diagram to show an example of the map information of the facilities at the designated locations displayed on the display unit 20. In this example in this drawing, there are displayed a plurality of facilities A, B, C and D within a range from a north IC exit 35 of an expressway 21 to a south IC entrance 36 and at the same time a guiding route 37 going from the north IC exit 35 to the south IC entrance 36 by way of the facilities. Moreover, threshold values 38 (38a, 38b) from the north IC exit 35 and threshold values 39 to the south IC entrance 36 are displayed by dotted lines. Here, in the threshold values 38 from the north IC exit 35, a threshold value 38a is a threshold value of an urban area and a threshold value 38b is a threshold value of a suburban area. When map density of the vicinity of the north IC exit 35 is higher than that of the basic density and hence it is found to be an urban area, the threshold value 38a is displayed and when map density of the vicinity of the north IC exit 35 is lower than that of the basic density and hence it is found to be a suburban area, the threshold value 38b is displayed.

As shown in FIG. 17, an icon 40 for returning to a list display is-displayed on the screen of map information of facilities. When the user turns on this icon 40, this screen is switched to the screen of a list display in FIG. 14. That is to say, in the flow shown in FIG. 15, it is determined whether it is instructed to display a list (step ST95) and when it is instructed to display a list, a list of display information is displayed on the display unit 20 (step ST96).

The icon 28 for the completion of search is also displayed on the screens shown in FIG. 14, FIG. 16 and FIG. 17. When the user turns on this icon 28, the search process has been completed. That is to say, in the flow in FIG. 15, it is determined whether it is instructed to complete the search process (step ST97) and in a case where it is not instructed to complete the search process, the program proceeds to step ST91 where the user setting process is continuously performed whereas in a case where it is instructed to complete the search process, the program returns to the main flow in FIG. 3.

As described above, according to this embodiment 1, in a case where the present vehicle position is on an expressway and a designated target facility is located outside the expressway, the route search block 3 makes the display block 7 display the search result of a guiding route from the expressway exit to the expressway entrance by way of the selected facility. Thus, it is possible to produce an effect of performing a search for a guiding route in a case where a user driving on an expressway utilizes a facility outside the expressway and then again returns from the facility to the expressway.

Further, according to this embodiment 1, the route search block 3 makes the display block 7 display a total running distance from the expressway exit to the expressway entrance by way of the selected facility as a search result. Thus, it is possible to produce an effect of performing a search for the total running distance of a guiding route in a case where a user utilizes a facility outside the expressway and then again returns from the facility to the expressway.

Still further, according to this embodiment 1, the route search block 3 makes the display block 7 display a running distance from the expressway exit to the selected facility and a running distance from the selected facility to the expressway entrance together with a total running distance as search results. Thus, it is possible to produce an effect of performing a detailed search for a total running distance in a case where a user utilizes a facility outside the expressway and then again returns from the facility to the expressway, a running distance of a guiding route to a facility outside the expressway, and a running distance of a guiding route returning from the facility to the expressway.

Still further, according to this embodiment 1, the route search block 3 makes the display block 7 display a total predicted running time from the expressway exit to the expressway entrance by way of the selected facility as a search result. Thus, it is possible to produce an effect of performing a detailed search for a total predicted running time of a guiding route in a case where a user utilizes a facility outside the expressway and then again returns from the facility to the expressway.

Still further, according to this embodiment 1, the route search block 3 makes the display block 7 display a predicted running time from the expressway exit to the selected facility and a predicted running time from the selected facility to the expressway entrance together with a total predicted running distance as search results. Thus, it is possible to produce an effect of performing a detailed search for a total predicted running time in a case where a user utilizes a facility outside the expressway and then again returns from the facility to the expressway, a predicted running time of a guiding route to the facility outside the expressway, and a predicted running time of a guiding route returning from the facility to the expressway.

Still further, according to this embodiment 1, the route search block 3 makes the display block 7 display a list of search results of all facilities selected by the facility information selection block 6. Thus, it is possible to produce an effect of easily selecting available facilities outside the expressway.

Still further, according to this embodiment 1, the route search block 3 makes the display block 7 display a list of search results of all facilities selected by the facility information selection block 6 and running distances from the expressway to the respective facilities and running distances from the respective facilities to the expressway entrance. Thus, it is possible to produce an effect of easily selecting facilities within an available running distance outside the expressway.

Still further, according to this embodiment 1, the route search block 3 makes the display block 7 display a list of search results of all facilities selected by the facility information selection block 6 and predicted running times from the expressway to the respective facilities and predicted running times from the respective facilities to the expressway entrance. Thus, it is possible to produce an effect of easily selecting facilities within an available running time outside the expressway.

Still further, according to this embodiment 1, there is provided the display content setting part 5e for setting, according to the operation of user, a portion of search content of the search results 33 displayed as a list by the display block 7, and the route search block 3 displays a portion of search content set by the display content setting part 5e as the highlighted image 34 on the screen of the search result 33 displayed as a list. Thus, it is possible to produce an effect of easily grasping the search results of desired locations.

Still further, according to this embodiment 1, the route search block 3 changes threshold values set by the threshold value setting part 5d according to an area where the facility selected by the facility information selection block 6 exists and then performs a search for a guiding route. Thus, it is possible to produce an effect of performing a flexible search appropriate for the area in consideration of the dense state of roads in the area in which a search for the same facility is performed.

Still further, according to this embodiment 1, the route search block 3 changes a threshold value to a smaller value in a case where the density of map information in an area where a facility is located is higher than a basic density and changes a threshold value to a larger value in a case where the density of map information in an area where the facility is located is lower than the basic density. Thus, it is possible to produce an effect of easily determining the dense state of the area when a flexible search appropriate for the region is performed.

Still further, according to this embodiment 1, the route search block 3 changes a threshold value set by the threshold value setting part 5d according to a specific facility selected by the facility information selection block 6 and then performs a search for a guiding route. Thus, it is possible to produce an effect of performing a wider range of search for a facility designated by a user, for example, a bank where the user has an account or a gas station where the user can use his card than for the other facilities.

Still further, according to this embodiment 1, there is provided the vehicle information acquisition part 5c for acquiring the information of the vehicle and the route search block 3 changes a threshold value set by the threshold value setting part 5d and performs a search for a guiding route on a basis of the information of the remaining amount of fuel acquired by the vehicle information acquisition part 5c. Thus, it is possible to produce an effect of avoiding a trouble that a vehicle can not reach a target facility because the vehicle runs out of fuel.

Still further, according to this embodiment 1, there is provided the display content setting part 5e for changing the order of display of a plurality of facilities displayed as a list by the display block 7 according to the set operation, so it is possible to produce an effect of performing a search for a facility desired by a user on a priority basis.

Still further, according to this embodiment 1, in a case where a vehicle can not reach a facility selected by the facility information selection block 6 within business hours of the facility, the route search block 3 changes the facility to other facility and performs a search for a guiding route. Thus, it is possible to produce an effect of avoiding a trouble that although the vehicle reaches the desired facility, the business hours of the facility are over and hence the facility is not available.

Still further, according to this embodiment 1, there is provided the extra-vehicle information acquisition part 5b for acquiring extra-vehicle information and the route search block 3 changes the threshold value of a total predicted running time set by the threshold setting part 5d and performs a search for a guiding route on a basis of road traffic information acquired by the extra-vehicle information acquisition part 5b. Thus, it is possible to produce an effect of avoiding a trouble that a facility is not available within a desired time because of traffic jam.

Incidentally, in the above mentioned embodiment 1 has been described a case where when a user drives on the expressway, the user selects a running distance or a predicted running time as a threshold value of a search criterion of a facility outside the expressway, but the user can select other elements as the threshold value of the search criterion. For example, the user can select the width, the number of lanes and the flatness of a road as threshold values. Alternatively, the user can select the size and congestion level of a parking lot of a target facility to be searched.

What is claimed is:

1. An in-vehicle navigation device comprising:
    a facility information designation unit in which a user selects information pertaining to one or more facilities to be searched;
    a threshold value setting unit that sets a threshold value of a search criterion of the one or more facilities;
    a present position detection unit that detects a present position of a vehicle;
    a facility information selection unit that selects at least one facility satisfying the threshold value set by the threshold value setting unit from the information designated by the facility information designation unit; and
    a display that displays a list including at least one selected facility, where said user can dynamically select from the list a specific facility;
    a route search unit that, when the present position detected by the present position detection unit is on an expressway and the selected facility by the user is outside the expressway, outputs a search result of a guiding route from an exit of the expressway to an entrance of the expressway by way of each selected facility to a display unit to display the search result.

2. The in-vehicle navigation device as claimed in claim 1, wherein the route search unit provides the display unit a total running distance from the exit of the expressway to the entrance of the expressway by way of each selected facility.

3. The in-vehicle navigation device as claimed in claim 2, wherein the route search unit provides the display unit a running distance from the exit of the expressway to each selected facility and a running distance from each selected facility to the entrance of the expressway in addition to the total running distance.

4. The in-vehicle navigation device as claimed in claim 1, wherein the route search unit provides the display unit a total predicted running time from the exit of the expressway to the entrance of the expressway by way of each selected facility.

5. The in-vehicle navigation device as claimed in claim 4, wherein the route search unit provides the display unit a predicted running time from the exit of the expressway to each selected facility and a predicted running time from the selected facility to the entrance of the expressway in addition to the total predicted running time.

6. The in-vehicle navigation device as claimed in claim 1, wherein the route search unit provides the display unit a search result of all facilities selected by the facility information selection unit as a list.

7. The in-vehicle navigation device as claimed in claim 6, wherein the route search unit provides the display unit running distances from the exit of the expressway to the respective facilities and running distances from the respective facilities to the entrance of the expressway as a list in addition to the search result of all facilities selected by the facility information selection unit.

8. The in-vehicle navigation device as claimed in claim 6, wherein the route search unit provides the display unit predicted running times from the exit of the expressway to the respective facilities and predicted running times from the respective facilities to the entrance of the expressway as a list as a list in addition to the search result of all facilities selected by the facility information selection unit.

9. The in-vehicle navigation device as claimed in claim 1 further comprising:
    a display content setting unit that sets a portion of search content of the search result displayed as a list by the display block according to an operation, wherein the display unit displays the set portion as a highlighted image on a screen of the search result displayed as a list.

10. The in-vehicle navigation device as claimed in claim 1, wherein the route search unit changes a threshold value set by the threshold value setting unit according to an area where the facility selected by each facility information selection unit is located.

11. The in-vehicle navigation device as claimed in claim 10, wherein when a density of map information of the area where each facility is located is higher than a basic density, the route search unit changes the threshold value to a smaller value and when the density of map information of the area where each facility is located is lower than the basic density, the route search unit changes the threshold value to a larger value.

12. The in-vehicle navigation device as claimed in claim 1, wherein the route search unit changes the threshold value set by the threshold setting unit according to a specific facility selected by the facility information selection unit.

13. The in-vehicle navigation device as claimed in claim 1 further comprising:
    a vehicle information acquisition unit that acquires information regarding the vehicle, wherein the route search unit changes the threshold value set by the threshold value setting unit based on information regarding a remaining amount of fuel acquired by the vehicle information acquisition unit.

14. The in-vehicle navigation device as claimed in claim 1 further comprising:

a display content setting unit that changes an order of display of a plurality of facilities displayed as a list by the display unit.

15. The in-vehicle navigation device as claimed in claim 14, wherein the display content setting unit changes the order of display of a plurality of types of facilities for each type according to a setting operation.

16. The in-vehicle navigation device as claimed in claim 14, wherein the display content setting unit changes the order of display of a plurality of facilities of the same type for each brand name of the facilities.

17. The in-vehicle navigation device as claimed in claim 1, wherein when each facility selected by the facility information selection unit can not be reached within business hours of each facility, the route search unit changes each facility to another facility to perform a search for a guiding route.

18. The in-vehicle navigation device as claimed in claim 1 further comprising:
an extra-vehicle information acquisition unit that acquires information other than that on the vehicle, wherein the route search unit changes the threshold value of a total predicted running time set by the threshold value setting unit on a basis of road traffic information acquired by the extra-vehicle information acquisition part.

19. A method of providing in-vehicle navigation guidance, the method comprising:
selecting information by a user for one or more facilities to be searched;
setting a threshold value for a search criterion of the one or more facilities;
determining whether or not a current position of the vehicle is on an expressway;
selecting a facility that satisfies the threshold value;
displaying a list that includes at least one selected facility, where said user can dynamically select from the list a specific facility; and
when the current position is determined to be on an expressway and the selected user facility is outside the expressway, displaying a guiding route from an exit of the expressway to an entrance of the expressway by way of the selected facility.

20. The method of claim 19, further comprising:
acquiring information regarding the vehicle, wherein the threshold value is set based on information regarding a remaining amount of fuel included in the acquired information.

21. The method of claim 19, further comprising:
acquiring additional information, other than on the vehicle, wherein the threshold value is set based on road traffic information included in the additional information.

* * * * *